(12) United States Patent
Hamamoto

(10) Patent No.: US 10,060,811 B2
(45) Date of Patent: Aug. 28, 2018

(54) SEALING STRUCTURE AND PRESSURE CHANGE DETECTION DEVICE

(71) Applicant: SEIKO EPSON CORPORATION, Tokyo (JP)

(72) Inventor: Seiko Hamamoto, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 59 days.

(21) Appl. No.: 15/071,001

(22) Filed: Mar. 15, 2016

(65) Prior Publication Data

US 2016/0281868 A1    Sep. 29, 2016

(30) Foreign Application Priority Data

Mar. 26, 2015   (JP) ................. 2015-063904

(51) Int. Cl.
  *G01L 7/08*    (2006.01)
  *G01L 7/16*    (2006.01)
(52) U.S. Cl.
  CPC .................... *G01L 7/163* (2013.01)
(58) Field of Classification Search
  CPC . G01L 7/163; G01L 7/00; G01N 3/12; G01M 15/08; B41J 2/1752; B41J 2/17513
  USPC ................. 73/715, 700, 37, 114.16
  See application file for complete search history.

(56) References Cited

U.S. PATENT DOCUMENTS

2010/0020140 A1\* 1/2010 Yokouchi ................. B41J 2/175
                                                                  347/85
2012/0263416 A1\* 10/2012 Morioka .............. G02B 6/4214
                                                                  385/33

FOREIGN PATENT DOCUMENTS

JP          2000-211152       8/2000
JP          2010-023423       2/2010

\* cited by examiner

*Primary Examiner* — Manish S Shah
*Assistant Examiner* — Nigel Plumb
(74) *Attorney, Agent, or Firm* — Workman Nydegger

(57) ABSTRACT

There is provided a sealing structure in which sealing is performed by covering a fluid passage of a housing using a displacement member that is displaceable according to change in pressure. The displacement member includes a first projecting section which is a sealing section in an outer peripheral section, and a second projecting section which is formed in an inner peripheral section rather than the first projecting section, and the housing is capable of fixing the displacement member in a state in which the first projecting section is compressed, and includes a depression section, in which the second projecting section is placed when the displacement member is fixed, in a position which faces the second projecting section.

4 Claims, 4 Drawing Sheets

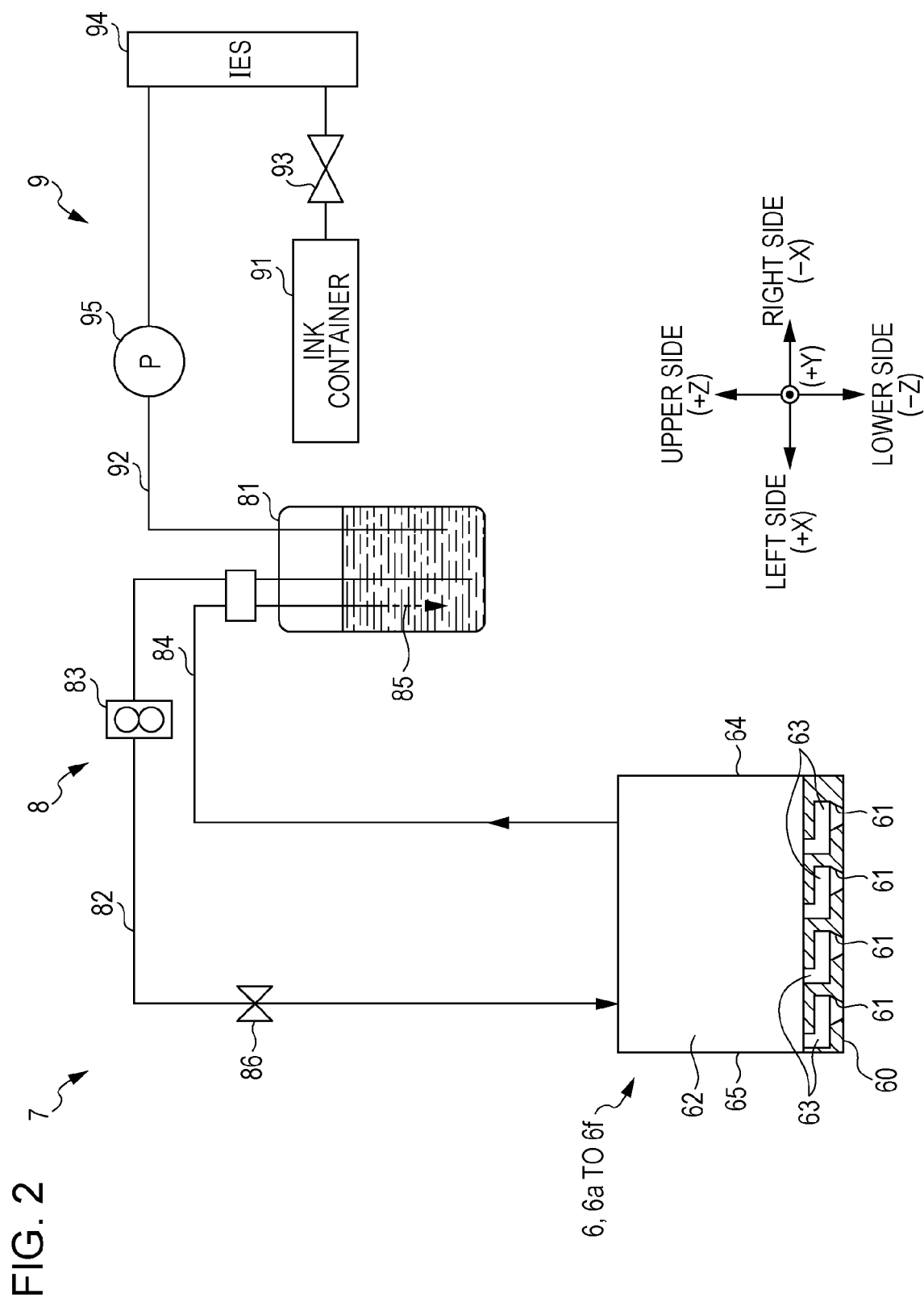

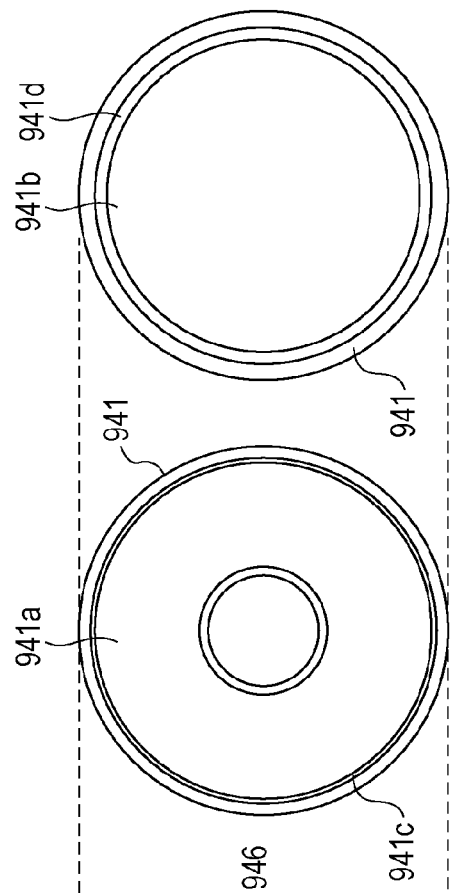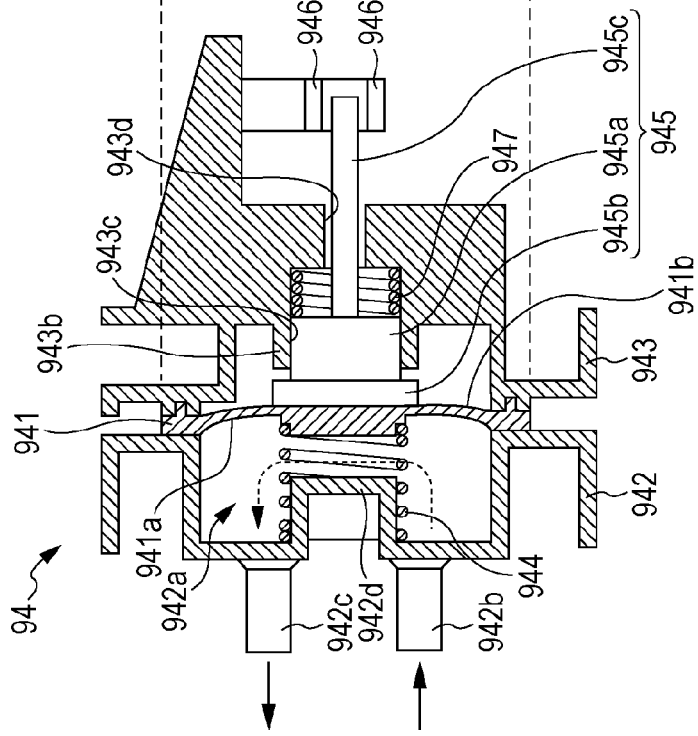

SEALING STRUCTURE AND PRESSURE CHANGE DETECTION DEVICE

BACKGROUND

1. Technical Field

The present invention relates to a sealing structure in which a housing is sealed using a displacement member that is displaceable according to change in pressure, and a pressure change detection device which includes the sealing structure.

2. Related Art

For example, JP-A-2000-211152 discloses a device in which a pressure change detection device is used as an ink end detection device for detecting the ink end of a main tank. The pressure change detection device includes a flexible displacement member which forms a part of an ink supply path and which is displaceable according to a change in the pressure occurring in the path, a spring member which is attached to the displacement member and biases the displacement member in a direction opposite to the direction in which the displacement member is displaced according to a drop in pressure occurring in the path, and a displacement detection section which detects the displacement of the displacement member. Further, the displacement member is attached to the main body of the pressure change detection device in a sealing state by means of thermal welding, thereby preventing ink from leaking.

In the device disclosed in JP-A-2000-211152, the displacement member comes into contact with ink, thereby accompanying temporal deterioration. Therefore, regular replacement is necessary. However, when the displacement member is thermally welded to the main body as described above, it is necessary to replace the whole main body. Here, it is considered that the displacement member is not thermally welded to the main body, a sealing section is provided around the displacement member, and the sealing section is compressed in the main body of the pressure change detection device, thereby attaching the displacement member to the main body in the sealing state. In this case, in order for the pressure change detection device to function normally, it is important that pressure does not leak from the sealing section of the displacement member. Therefore, it is necessary to strictly manage the amount of compression in the sealing section by taking the permanent deformation or the like of the sealing section into consideration.

In addition, such a problem is not characteristic of the pressure change detection device, and may occur, for example, in the sealing structure of the ink supply device (liquid supply device) disclosed in JP-A-2010-23423. In the same manner, it is desired to provide a sealing structure in which the permanent deformation of the sealing section is suppressed, and in which a pressure leak from the sealing section is effectively suppressed by strictly managing the amount of compression in the sealing section.

SUMMARY

An advantage of some aspects of the invention is to provide a technology which is capable of excellently preventing a pressure leak from a sealing section in a sealing structure in which a housing is sealed using a displacement member that is displaceable according to change in pressure.

The invention can be realized in the following aspects or application examples.

According to an aspect of the invention, there is provided a sealing structure in which sealing is performed by covering a fluid passage of a housing using a displacement member that is displaceable according to change in pressure, the displacement member includes a first projecting section which is a sealing section in an outer peripheral section, and a second projecting section which is formed in an inner peripheral section rather than the first projecting section, and the housing is capable of fixing the displacement member in a state in which the first projecting section is compressed, and includes a depression section, in which the second projecting section is placed when the displacement member is fixed, in a position which faces the second projecting section.

According to another aspect of the invention, there is provided a pressure change detection device, which is arranged at a part of a fluid channel through which fluid flows and which detects changes in pressure in the fluid channel, the pressure change detection device including: a displacement member that includes a first projecting section which is a sealing section in an outer peripheral section, and a second projecting section which is formed in an inner peripheral section rather than the first projecting section, and that displaces according to the change in the pressure occurring in the fluid channel; and a housing that is capable of fixing the displacement member in a state in which the first projecting section is compressed, and that includes a depression section, in which the second projecting section is placed when the displacement member is fixed, in a position which faces the second projecting section.

In this case, the displacement member is displaceable according to a change in the pressure, and, for example, the displacement member displaces in the suction direction when sucking force is applied. At this time, the second projecting section comes into contact with the wall surface of the depression section of the housing and receives reaction force. With the reaction force, the deformation of the displacement member due to the sucking force is prevented in an area on the outer side rather than the second projecting section in the outer peripheral section of the displacement member. In addition, when negative pressure is applied to the displacement member, the thickness of the first projecting section becomes thick, and thus the amount of compression corresponding to the sealing section increases. As a result, the sealing performance is improved due to the sealing section, and thus it is possible to securely prevent a pressure leak. In addition, when the sucking force stops, the thickness of the displacement member becomes reduced. Therefore, the amount of sealing compression decreases, which results in the loads which are applied to the sealing section being lowered, and thus it is possible to suppress permanent deformation of the sealing section.

Meanwhile, although the second projecting section is formed in an arbitrary position if the displacement member is placed in the depression section of the housing when the displacement member is fixed, it is preferable that the second projecting section is formed on a surface opposite to the surface on which the first projecting section is formed. The reason for this is that, in this case, fluid does not come into contact with the second projecting section and it is possible to effectively prevent the second projecting section from being deteriorated.

All of the plurality of components which have the above-described respective forms of the invention are not necessarily required. In order to solve a part or all of the above-described problems, or in order to implement a part or all of the advantages described in the specification, it is possible to appropriately perform modification, removal, or replacement with another new component on a partial component of the plurality of component, thereby removing a part of limited content. In addition, in order to solve a part or all of the above-described problems, or in order to realize a part or all of the advantages described in the specification, the invention can be realized in an independent form by combining parts or all of the technical characteristics included in the form of the above-described invention with parts or all of the technical characteristics included in another form of the above-described invention.

BRIEF DESCRIPTION OF THE DRAWINGS

The invention will be described with reference to the accompanying drawings, wherein like numbers reference like elements.

FIG. 2 is a view schematically illustrating the configuration of an ink supply device which performs ink supply on a printing head.

FIGS. 3A to 3C are views illustrating the configuration of the pressure change detection device according to the embodiment of the invention.

DESCRIPTION OF EXEMPLARY EMBODIMENTS

Figure 1:
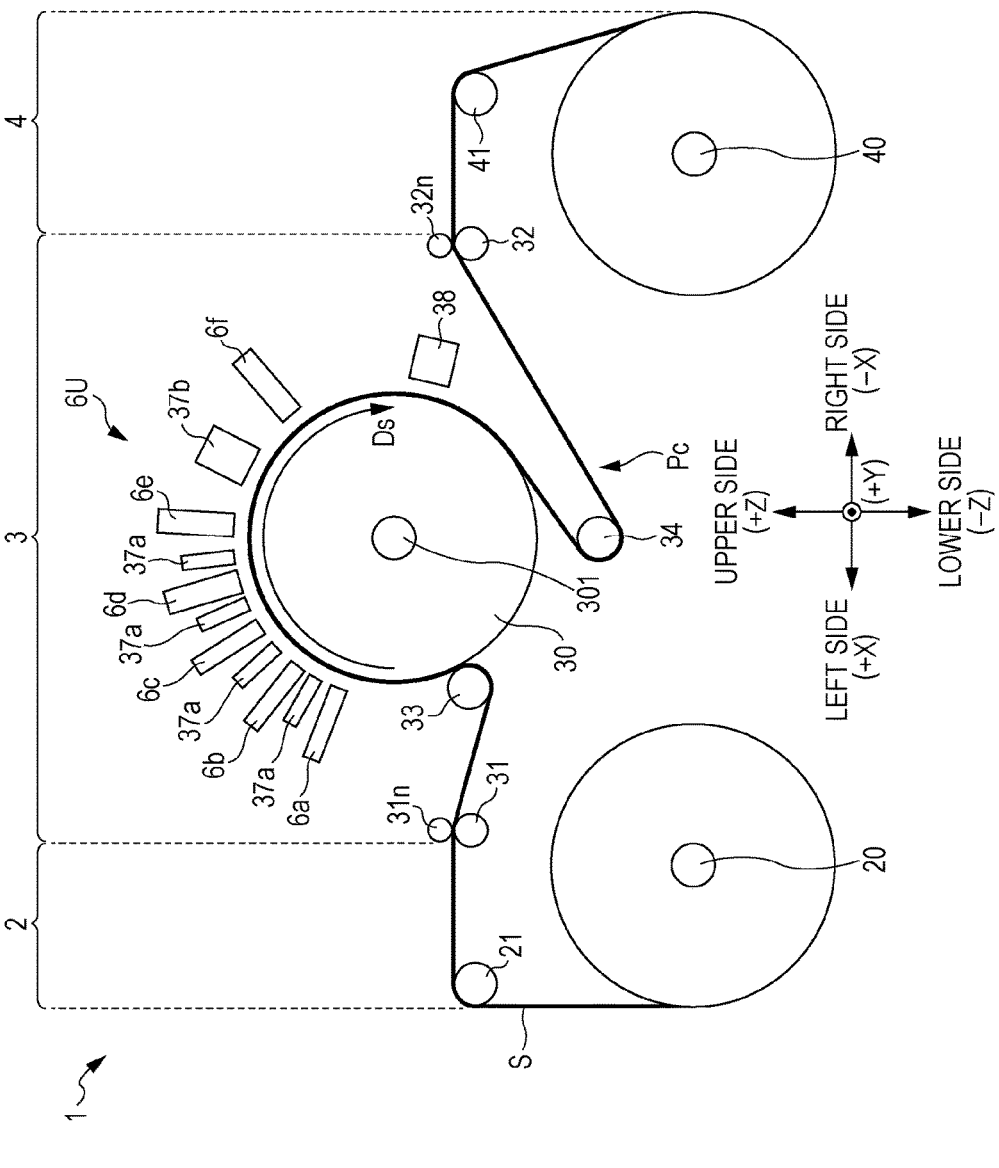
FIG. 1 is a front view schematically illustrating the configuration of a printer to which a pressure change detection device according to an embodiment of the invention can be applied.

Hereinafter, the configuration of a printer which includes an ink end detection device that is an example of a pressure change detection device of the invention will be described with reference to the accompanying drawings. FIG. 1 is a front view schematically illustrating the configuration of a printer to which a pressure change detection device according to an embodiment of the invention can be applied. Meanwhile, in the drawings below, in order to make the relation of placement between the respective sections of the printer 1 clear, a 3-dimensional coordinate system, which includes the horizontal direction X, the front and rear direction Y, and the vertical direction Z of the printer 1, if necessary.

As illustrated in FIG. 1, in the printer 1, a delivery section 2, a process section 3, and a winding section 4 are arranged in the horizontal direction. The delivery section 2 and the winding section 4 respectively include a delivery shaft 20 and a winding shaft 40. Further, both the ends of the sheet S (web) are wound to the delivery section 2 and the winding section 4 in a roll shape, and are stretched therebetween. The sheet S, which is stretched in this manner, is transported from the delivery shaft 20 to the process section 3 along the transport path Pc and receives an image recording process by a printing unit 6U, and then transported to the winding shaft 40. The kind of the sheet S is divided broadly into a paper system and a film system. More specifically, the paper system includes wood free paper, cast paper, art paper, coated paper, and the like, and the film system includes synthetic paper, Polyethylene terephthalate (PET), Polypropylene (PP), and the like. Meanwhile, in the description below, a surface, on which an image is recorded, is called a front surface, and an opposite side surface thereto is called a back surface in both the surfaces of the sheet S.

The delivery section 2 includes the delivery shaft 20 which winds the end of the sheet S, and a driven roller 21 which winds the sheet S which is drawn from the delivery shaft 20. The delivery shaft 20 winds and supports the end of the sheet S in a state in which the front surface of the sheet S faces outwards. Further, when then delivery shaft 20 rotates clockwise in FIG. 1, the sheet S, which is wound to the delivery shaft 20, is delivered to the process section 3 through the driven roller 21.

In the process section 3, while the sheet S which is delivered from the delivery section 2 is supported by a platen drum 30, an image is recorded on the sheet S using the printing unit 6U. That is, the printing unit 6U includes a plurality of printing heads 6a to 6f which are placed along the front surface of the platen drum 30. When the printing heads 6a to 6f discharge ink to the sheet S, which is supported by the front surface of the platen drum 30, the image is recorded on the sheet S. In the process section 3, a preceding driving roller 31 and a following driving roller 32 are provided on both sides of the platen drum 30, and the sheet S, which is transported from the preceding driving roller 31 to the following driving roller 32, is supported by the platen drum 30, and image printing is performed thereon.

The preceding driving roller 31 includes a plurality of minute projections, which are formed through spraying, on an outer peripheral surface, and winds up the sheet S, which is delivered from the delivery section 2, from the side of the back surface. Further, the preceding driving roller 31 rotates clockwise in FIG. 1, and thus the sheet S, which is delivered from the delivery section 2, is transported to the platen drum 30 through the driven roller 33. Meanwhile, a nip roller 31n is provided for the preceding driving roller 31.

The platen drum 30 is a cylindrical drum which is supported to be rotatable by a support mechanism which is not shown in the drawing, and winds the sheet S, which is transported from the preceding driving roller 31 to the following driving roller 32, from the back surface side. The platen drum 30 receives friction force between the platen drum 30 and the sheet S, performs driven rotation in the transport direction Ds of the sheet S, and supports the sheet S from the back surface side. In addition, in the process section 3, driven rollers 33 and 34, which fold back the sheet S on both sides of the winding section of the platen drum 30, are provided.

The following driving roller 32 includes a plurality of minute projections, which are formed through spraying, on the outer peripheral surface, and winds the sheet S, which is transported from the platen drum 30 through the driven roller 34, from the back surface side. Further, the following driving roller 32 rotates clockwise in FIG. 1, thereby transporting the sheet S to the winding section 4.

As described above, the sheet S, which is transported from the preceding driving roller 31 to the following driving roller 32, is supported by the outer peripheral surface of the platen drum 30. Further, in the process section 3, there are provided with the printing head 6a for performing solid printing on the front surface of the sheet S which is supported by the platen drum 30, the plurality of printing heads 6b to 6e respectively corresponding to different colors for recording a color image, and the printing head 6f for printing colorless and transparent clear ink on the color image in order to protect and brighten the image. More specifically, six printing heads 6a to 6f respectively corresponding to white, cyan, magenta, yellow, black, and clear are placed in order of the color along the transport direction Ds.

The printing heads 6a to 6f have the same configuration as each other, and face the front surface of the sheet S which is supported by the platen drum 30 with a slight amount of clearance. Further, relevant color ink is discharged from a nozzle which is open toward the front surface of the platen drum 30 using an ink jet method. Accordingly, ink is discharged to the sheet S, which is transported along the transport direction Ds, and thus the solid white image or the color image is formed on the front surface of the sheet S. In addition, a clear ink layer is formed on the image which is formed as described above, and the image is protected. Meanwhile, a plurality of ink supply devices corresponding to the number (kind) of the colors of ink, which is used in the printer 1 according to the embodiment, are provided. However, the configurations thereof will be described later in detail with reference to FIG. 2.

Here, ultraviolet (UV) ink (photosetting ink), which hardens when ink is irradiated with ultraviolet (light), is used as ink (recording liquid). Here, UV lamps 37a and 37b are provided to cause ink to harden and to be fixed to the sheet S. Meanwhile, ink hardening is divided into two steps, such as temporary hardening and main hardening, and then performed. The UV lamps 37a for temporary hardening are arranged between the respective printing heads 6a to 6e. That is, when the UV lamp 37a irradiates weak ultraviolet, ink hardens (performs temporary hardening) to a degree at which the shape of the ink does not collapse, and thus the ink does not completely harden. In contrast, on the downstream side of the transport direction Ds for the printing heads 6a to 6e, the UV lamp 37b for main hardening is provided. That is, when the UV lamp 37b irradiates weaker ultraviolet than the UV lamps 37a, the ink completely hardens (performs main hardening). When the temporary hardening and the main hardening are performed as described above, it is possible to fix the solid white, which is formed by the printing head 6a, and the color image, which is formed by the printing heads 6b to 6e, on the front surface of the sheet S.

Further, on the downstream side of the transport direction Ds for the UV lamp 37b, the printing head 6f is arranged to face the front surface of the platen drum 30. The printing head 6f has the same configuration as each of the printing heads 6a to 6e, and discharges transparent UV ink to the front surface of the sheet S using the ink jet method. That is, the printing head 6f faces the front surface of the sheet S, which is supported by the platen drum 30, with a slight amount of clearance, and discharges transparent ink using the ink jet method. Accordingly, transparent ink is further discharged to the solid white, which is formed by the printing head 6a, and the color image which is formed by the printing heads 6b to 6e corresponding to four colors.

In addition, a UV lamp 38 is provided on the downstream side of the transport direction Ds for the printing head 6f. When the UV lamp 38 irradiates strong ultraviolet light, the transparent ink, which is discharged by the printing head 6f, completely hardens (main hardening). Accordingly, it is possible to fix transparent ink on the front surface of the sheet S.

As above, in the process section 3, the discharge or hardening of ink is appropriately performed on the sheet S, which is supported by the platen drum 30, and thus the color image, which is coated with transparent ink, is formed. Further, the sheet S, on which the color image is formed, is transported to the winding section 4 by the following driving roller 32.

The winding section 4 includes the winding shaft 40 which winds the end of the sheet S and the driven roller 41 which winds the sheet S to be transported to the winding shaft 40. The winding shaft 40 winds and supports the end of the sheet S in a state in which the front surface of the sheet S faces the outside. Further, when the winding shaft 40 rotates clockwise in FIG. 1, the sheet S is wound to the winding shaft 40 through the driven roller 41.

FIG. 2 is a view schematically illustrating the configuration of the ink supply device which supplies ink to the printing heads. In the printer 1, ink supply devices which perform ink supply on the respective printing heads 6a to 6f are provided. Meanwhile, since the printing heads 6a to 6f respectively have the same configuration, hereinafter, any one of the printing heads 6a to 6f is expressed as a printing head 6 without being distinguished from the printing heads 6a to 6f, and ink supply performed on the printing head 6 will be described.

The printing head 6 includes nozzles 61 which are open on a nozzle forming surface 60, a reservoir 62 which temporarily stores ink, and cavities 63 through which the nozzles 61 with the reservoir 62 communicate. Ink is supplied from the reservoir 62 to the nozzles 61 through the cavities 63. Further, when the cavities 63 apply pressure to ink according to an operational instruction from a control unit (not shown in the drawing), ink is discharged from the nozzles 61. In addition, an ink supply device 7 is provided for the printing head 6.

The ink supply device 7 includes an ink circulation mechanism 8, which performs circulation between a sub tank 81 for storing ink and the reservoir 62 of the printing head 6, and an ink supply mechanism 9 which supplies ink to the sub tank 81.

In order to perform an ink circulation function, the ink circulation mechanism 8 further includes a supply channel (supply pipe) 82 which connects the reservoir 62 to the sub tank 81, a circulation pump 83 which is provided in the supply channel 82, and a collection channel (collection pipe) 84 which connects the reservoir 62 to the sub tank 81, in addition to the sub tank 81. The sub tank 81, the supply channel 82, the reservoir 62, and the collection channel 84 form a circulation path 85 through which ink flows. When the circulation pump 83 rotates in a forward direction, ink is circulated through the circulation path 85. That is, when the circulation pump 83 is rotated in the forward direction, it is possible to supply ink from the sub tank 81 to the reservoir 62 through the supply channel (forward path) 82, and it is possible to collect ink from the reservoir 62 to the sub tank 81 through the collection channel (reverse path) 84.

In addition, the ink circulation mechanism 8 includes a valve 86 which opens and closes the supply channel 82. The valve 86 is provided in the middle of the circulation path 85 from the circulation pump 83 to the reservoir 62. Therefore, when the valve 86 opens, it is possible to perform ink supply from the sub tank 81 to the reservoir 62. When the valve 86 is closed, it is possible to stop the ink supply from the sub tank 81 to the reservoir 62.

The ink supply mechanism 9 includes an ink container 91 such as an ink cartridge or an ink pack, and supplies ink from the ink container 91 to the sub tank 81. More specifically, the ink supply mechanism 9 includes a supply channel (supply pipe) 92 which connects the sub tank 81 to the ink container 91, a valve 93 which is provided in the supply channel 92, an ink end sensor 94 which functions as an ink end detection device, and a supply pump 95, in addition to the ink container 91. The valve 93, the ink end sensor 94, and the supply pump 95 are inserted into the supply channel 92 in this order from the side of the ink container 91 toward the side of the sub tank 81. Further, when the supply pump 95 is intermittently operated according to the operational instruction from the control unit in a state in which the valve 93 is formed, ink in the ink container 91 is sent through the supply channel 92 and supplied to the sub tank 81. In addition, during the ink sending operation, it is possible to detect so-called ink end, in which the ink container 91 becomes in a state of being empty of ink, by the ink end sensor 94 which is formed as follows.

Figure 4A:
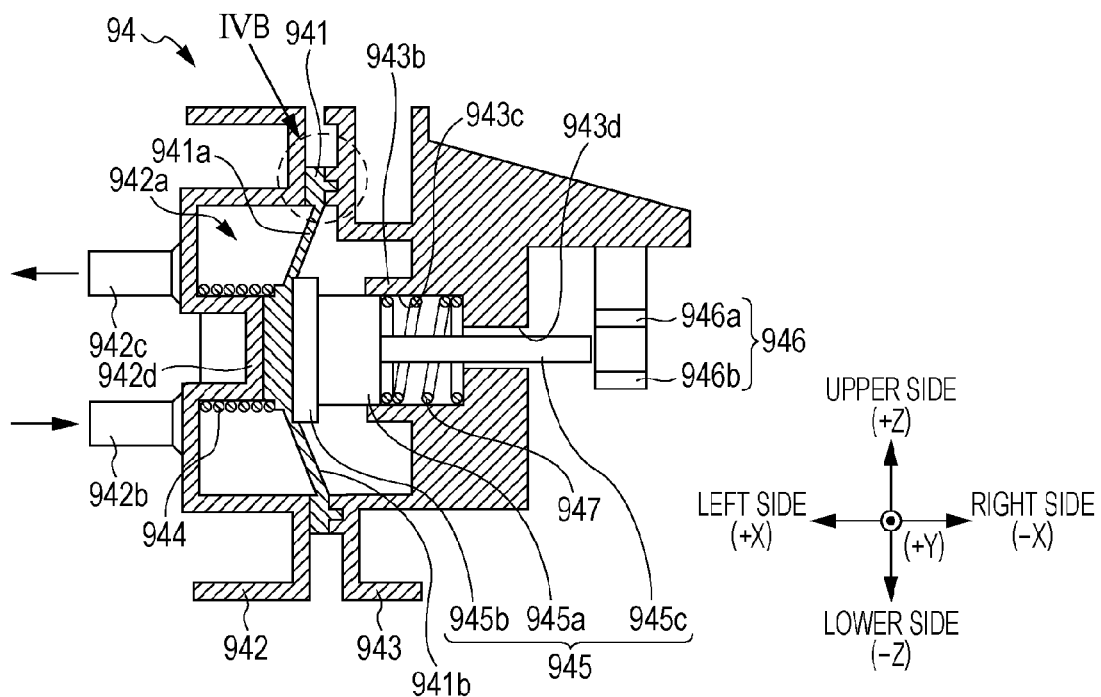
FIGS. 4A and 4B are views illustrating the configuration of the pressure change detection device according to the embodiment of the invention.
Figure 4B:
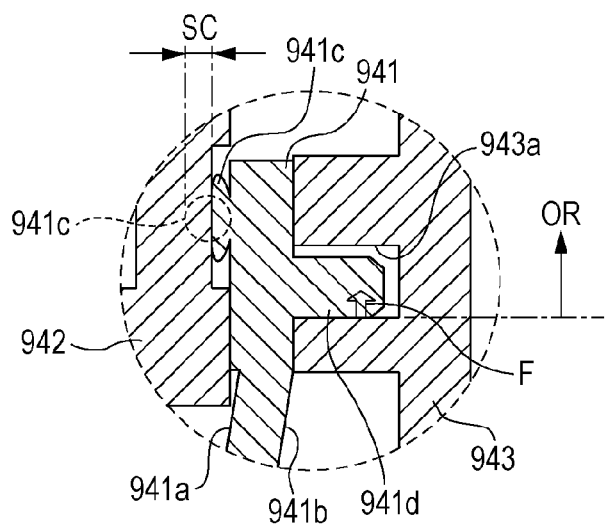

FIGS. 3A to 3C and FIGS. 4A and 4B are views illustrating the configuration of the ink end sensor which is the pressure change detection device according to the embodiment of the invention. FIGS. 3A to 3C illustrate the configurations of the respective sections of the sensor when the supply pump is OFF. In contrast, FIGS. 4A and 4B illustrate the configurations of the respective sections of the sensor when the supply pump is ON. In addition, FIG. 3A illustrates the internal structure of the ink end sensor 94, FIG. 3B illustrates one-side principal surface 941$a$ of a displacement member 941 of the ink end sensor 94, and FIG. 3C illustrates the other side principal surface 941$b$ of the displacement member 941. Further, FIG. 4A illustrates the internal structure of the ink end sensor 94, and FIG. 4B is a partially enlarged view illustrating a sealing section.

The ink end sensor 94 is inserted in the supply channel 92, and forms a part of an ink channel (fluid channel) from the ink container 91 to the sub tank 81. The ink end sensor 94 includes the displacement member 941 which has a diaphragm structure that generates displacement according to change in pressure, and a pair of housing members 942 and 943. In the outer peripheral section of the displacement member 941, a circular protrusion section 941$c$ is approximately vertically protruded from the one side principal surface 941$a$ of the displacement member 941, and, slightly on an inner peripheral side rather than the circular protrusion section 941$c$, a circular protrusion section 941$d$ is approximately vertically protruded from the other side principal surface 941$b$ of the displacement member 941, as illustrated in FIGS. 3A to 3C. Meanwhile, it is necessary that the protrusion section 941$c$ of the above sections is provided in a circular closed shape in order to function as the sealing section. However, the protrusion section 941$d$ does not have the above restriction, and may prevent the deformation of the displacement member 941 as will be described later and may be intermittently provided on the inner peripheral side rather than the protrusion section 941$c$. In addition, in the embodiment, in a state in which external force is not applied to the displacement member 941, that is, in the simple displacement member 941, the amount of protrusion of the protrusion section 941$d$ is higher than the protrusion section 941$c$. In addition, the protrusion section 941$d$ has a thicker thickness than the protrusion section 941$c$, and the protrusion section 941$d$ has a wider sectional area than the protrusion section 941$c$.

In the ink end sensor 94, in a state in which the one side principal surface 941$a$ of the displacement member 941 faces the housing member 942 and the principal surface 941$b$ on the other side faces the housing member 943, the housing members 942 and 943 are integrated in such a way that the housing members 942 and 943 are fastened by a fastening member (not shown in the drawing) while inserting outer peripheral section of the displacement member 941 over the entire peripheries.

Both the housing members 942 and 943 are formed of resin, and the "housing" of the invention is formed by integrating the housing members 942 and 943. In the housing member 942, on a side ((−X) side of FIG. 3A) which faces the one side principal surface 941$a$ of the displacement member 941, an ink passage (fluid passage) 942$a$ is formed to distribute ink as shown using an arrow in the drawing. Further, in the ink end sensor 94, the one side principal surface 941$a$ of the displacement member 941 is arranged to cover the ink passage 942$a$. Meanwhile, reference symbols 942$b$ and 942$c$ in FIGS. 3A to 3C and FIGS. 4A and 4B respectively indicate an inlet pipe and an outlet pipe, and function as parts of the ink channel.

At approximately the central part of the housing member 942, a guide section 942$d$ is provided to face the one side principal surface 941$a$ of the displacement member 941. In addition, a coil-shaped spring member 944 is arranged around the guide section 942$d$, and biases the one side principal surface 941$a$ of the displacement member 941 against the side of the housing member 943.

In contrast, a groove 943$a$ (refer to FIG. 4B), which is capable of being engaged to the circular protrusion section 941$d$, is formed on the outer peripheral surface which comes into contact with the other side principal surface 941$b$ of the displacement member 941 of the housing member 943. Further, when the housing members 942 and 943 are integrated in a state in which the outer peripheral section of the displacement member 941 is inserted over the entire peripheries, the circular protrusion section 941$d$ is fitted to the groove 943$a$. In addition, at approximately the central part of the housing member 943, a cylindrical guide tube 943$b$ is protruded toward the other side principal surface 941$b$ of the displacement member 941, a depression section 943$c$ is provided to communicate with the hollow space of the guide tube 943$b$, and, further, a through hole 943$d$ is provided on a side ((−X) side of FIG. 3A) opposite the displacement member 941 from the bottom central part of the depression section 943$c$.

Further, a cylindrical member 945$a$ is provided to be able to slide in the X direction by the guide tube 943$b$ and the depression section 943$c$. A contact member 945$b$, which is capable of coming into contact with the central part of the other side principal surface 941$b$, is attached to the end surface of the cylindrical member 945$a$ on the (+X) side, that is, a surface which faces the other side principal surface 941$b$ of the displacement member 941. In addition, a shaft member 945$c$ is extended in the (−X) direction from the end surface of the cylindrical member 945$a$ on the (−X) side while penetrating through the depression section 943$c$ and the through hole 943$d$, and the tip of the shaft member 945$c$ is extended toward a transmission type sensor section 946. A connection body 945, which is formed by connecting the cylindrical member 945$a$, the contact member 945$b$, and the shaft member 945$c$ as above, is movable in the X direction. Moreover, in the depression section 943$c$, a coil-shaped spring member 947 is arranged around the shaft member 945$c$ in the inner bottom space of the depression section 943$c$, and biases the connection body 945 against the other side principal surface 941$b$ of the displacement member 941, as illustrated in FIG. 3A. Meanwhile, in the embodiment, the biasing force of the spring member 944 is larger than the biasing force of the spring member 947. As illustrated in FIG. 3A, when the supply pump 95 is in an OFF state and negative pressure is not applied to the displacement member 941, the displacement member 941 is slightly bent in the (−X) direction side. As a result, the connection body 945 performs shift movement in the (−X) direction, the tip of the shaft member 945$c$ goes between the light projection section 946$a$ and the light reception section 946$b$ of the transmission-type sensor section 946, and thus the sensor section 946 is in an OFF state.

In contrast, when the supply pump 95 is switched to the ON state during a predetermined time in order to send liquid, ink in the ink passage 942$a$ is sucked. Further, the ink is sent through the outlet pipe 942$c$. At this time, negative pressure is applied to the displacement member 941. When the negative pressure is received, the central part of the displacement member 941 moves in the (+X) direction while going against the biasing force of the spring member 944, and comes into contact with the (−X) side end surface of the guide section 942d, as illustrated in FIGS. 4A and 4B. In addition, the circular protrusion section 941d is positioned on the inner peripheral side rather than the circular protrusion section 941c, comes into contact with the inner wall of the groove 943a in accordance with the movement of the displacement member 941 in the (+X) direction, and receives reaction force F in the (+Z) direction rather than the housing member 943. Therefore, in the displacement member 941, the deformation of the outer peripheral area OR on the outer peripheral side rather than the protrusion section 941d is prevented and negative pressure is received, with the result that the thickness of the displacement member 941 expands, and thus the tip of the circular protrusion section 941c, which functions as the sealing section, is further crushed in the housing member 942, as illustrated in FIG. 4B. As a result, in a case in which the supply pump 95 is operated, the amount of sealing compression SC (refer to FIG. 4B) increases compared to the case in which the supply pump 95 stops (FIGS. 3A to 3C), and thus it is possible to securely prevent a pressure leak when sending liquid.

Meanwhile, when the supply pump 95 returns to the OFF state and ink remains in the ink container 91, the displacement member 941 returns to an original position, that is, returns to the state illustrated in FIG. 3A. At this time, the application of the negative pressure to the displacement member 941 is eliminated and the expansion of the displacement member 941 is cancelled. Accordingly, the amount of sealing compression SC decreases. Therefore, during the time when the supply pump 95 is subsequently intermittently operated and the ink supply is performed, loads which are applied to the sealing section decrease. As a result, it is possible to effectively suppress permanent deformation of the sealing section.

In addition, during the time when the supply pump 95 is in an ON state, the tip of the shaft member 945c retreats from between the light projection section 946a of the transmission-type sensor section 946 and the light reception section 946b, and thus the transmission-type sensor section 946 is in the ON state, as illustrated in FIG. 4A. However, when ink remains in the ink container 91 as described above and the supply pump 95 returns to the OFF state, the tip of the shaft member 945c goes into between the light projection section 946a and the light reception section 946b of the transmission-type sensor section 946, and the transmission-type sensor section 946 returns to the OFF state again, as illustrated in FIG. 3A. In contrast, in a case in which ink does not remain in the ink container 91, that is, in a case of ink end, the tip of the shaft member 945c only retreats from between the light projection section 946a and the light reception section 946b of the transmission-type sensor section 946 even when the supply pump 95 returns to the OFF state, and thus the transmission-type sensor section 946 is in the ON state. It is possible to detect the ink end state by detecting the fact that the ON state of the transmission-type sensor section 946 is continuous for a predetermined period of time.

As described above, in the embodiment, liquid is sent to the sub tank 81 by intermittently operating the supply pump 95 which is arranged on the downstream side of the ink end sensor 94, the negative pressure is generated at regular intervals in order to suck the inside of the ink container 91, and the negative pressure is applied to the displacement member 941 of the ink end sensor 94 at that timing. Further, when the negative pressure is received, the sealing structure, in which sealing performance is enhanced in such a way that the amount of sealing compression SC increases, and thus bubbles are prevented from being mixed with ink which flows through the ink channel. Therefore, it is possible to stabilize the state of ink discharged from the printing head 6.

In addition, when ink is not sent, that is, when the supply pump 95 stops, the amount of sealing compression SC returns to a small value, and thus it is possible to reduce temporal deformation of the sealing section. Therefore, it is possible to stably and accurately detect the ink end state by the ink end sensor 94 over a long period of time.

In addition, in the ink end sensor 94, a configuration, in which the amount of sealing compression SC automatically increases at timing that the negative pressure is received, is used as described above, and thus it is possible to improve the assemblability of the ink end sensor 94. That is, in the embodiment, the ink end sensor 94 is constructed by integrally fastening the housing members 942 and 943 such that the outer peripheral section of the displacement member 941 is inserted, and it is possible to suppress the amount of sealing compression SC to be low in a case of the construction.

In addition, the circular protrusion section 941d is provided on the inner peripheral side rather than the circular protrusion section 941c, which functions as the sealing section, and thus the circular protrusion section 941d is configured such that the circular protrusion section 941d receives the reaction force F rather than the housing member 943 when liquid is sent. Therefore, it is possible to suppress the deformation of the circular protrusion section 941c (sealing section), and it is possible to stably send ink and to detect ink end. Meanwhile, as a structure in which the reaction force is received, the protrusion section 941d may be provided on the side of the one side principal surface 941a of the displacement member 941. However, when it is considered that the protrusion section 941d changes with time because the protrusion section 941d comes into contact with ink, it is desirable to avoid the protrusion section 941d from coming into contact with liquid by providing the protrusion section 941d on the side of the other side principal surface 941b of the displacement member 941 as described in the embodiment. Therefore, it is possible to stably and accurately detect the ink end state by the ink end sensor 94 over a long period of time.

In the above embodiment, the protrusion sections 941c and 941d of the displacement member 941 respectively correspond to examples of the "first projecting section" and the "second projecting section" of the invention. In addition, the groove 943a, which is provided in the housing member 943, is corresponds to an example of the "depression section" of the invention. In addition, the one side principal surface 941a of the displacement member 941 corresponds to the "surface on which the first projecting section is formed" of the invention, and the other side principal surface 941b corresponds to the "surface opposite to the surface on which the first projecting section is formed" of the invention.

Meanwhile, the invention is not limited to the above-described embodiment, and the components of the embodiment can be appropriately combined or various modifications can be added without departing from the gist of the invention. For example, in the embodiment, the ink end state is detected by combining the connection body 945 with the transmission-type sensor section 946. However, a reflection type sensor may be used instead of the transmission type sensor. In addition, the contact member 945b of the connection body 945 is provided to be able to be separated from or to come into contact with the other side principal surface 941*b* of the displacement member 941. However, configuration may be made such that the contact member 945*b* is caused to come into contact with the other side principal surface 941*b* of the displacement member 941 in advance such that the connection body 945 moves together with the displacement of the displacement member 941. In this case, the spring member 947 may be omitted.

In addition, in the embodiment, the invention is applied to the ink end sensor 94 which is applied to the printer 1 using photosetting ink. However, the invention can be applied to a printer using another type of ink. In addition, it is possible to apply the sealing structure used in the embodiment, to a device other than the ink end sensor 94, for example, the device disclosed in JP-A-2010-23423, and thus the same advantages are acquired. Further, it is possible to apply the invention to a liquid discharge device which discharges liquid other than ink.

The entire disclosure of Japanese Patent Application No. 2015-063904, filed Mar. 26, 2015 is expressly incorporated by reference herein.

What is claimed is:

1. A sealing structure in which sealing is performed by covering a fluid passage of a housing, the sealing structure comprising:
    a displacement member that is displaceable according to change in pressure and that includes an outer peripheral section,
    wherein the displacement member includes a first projecting section which is a sealing section in the outer peripheral section, and a second projecting section which is formed in an inner peripheral section rather than the first projecting section, wherein the displacement member includes a first surface and a second surface that is on an opposite side as the first surface, the first projecting section being formed on the first surface and the second projecting section being formed on the second surface;
    wherein the housing is capable of fixing the displacement member in a state in which the first projecting section is compressed to increase an amount of sealing compression between the displacement section and the housing when a negative pressure is generated to suck the fluid, and includes a depression section, in which the second projecting section is placed when the displacement member is fixed, in a position which faces the second projecting section, and
    wherein the second projecting section is arranged to receive a reaction force when the fluid is sucked.

2. The sealing structure according to claim 1, wherein the housing includes a second depression into which the first projection is placed.

3. A pressure change detection device, which is arranged at a part of a fluid channel through which fluid flows and which detects change in pressure in the fluid channel, the pressure change detection device comprising:
    a displacement member that includes an outer peripheral section and a first projecting section which is a sealing section in the outer peripheral section, and a second projecting section which is formed in an inner peripheral section rather than the first projecting section, and that displaces according to the change in the pressure occurring in the fluid channel, wherein the displacement member includes a first surface and a second surface that is on an opposite side as the first surface, the first projecting section being formed on the first surface and the second projecting section being formed on the second surface; and
    a housing that is capable of fixing the displacement member in a state in which the first projecting section is compressed to increase an amount of sealing compression between the displacement section and the housing when a negative pressure is generated to suck the fluid, and that includes a depression section, in which the second projecting section is placed when the displacement member is fixed, in a position which faces the second projecting section, and
    wherein the second projecting section is arranged to receive a reaction force when the fluid is sucked.

4. The pressure change detection device according to claim 3, wherein the housing includes a second depression into which the first projection is placed.

* * * * *